Nov. 17, 1936.                A. EMERY                    2,061,353
CORNSTALK HARVESTER
Filed March 10, 1936
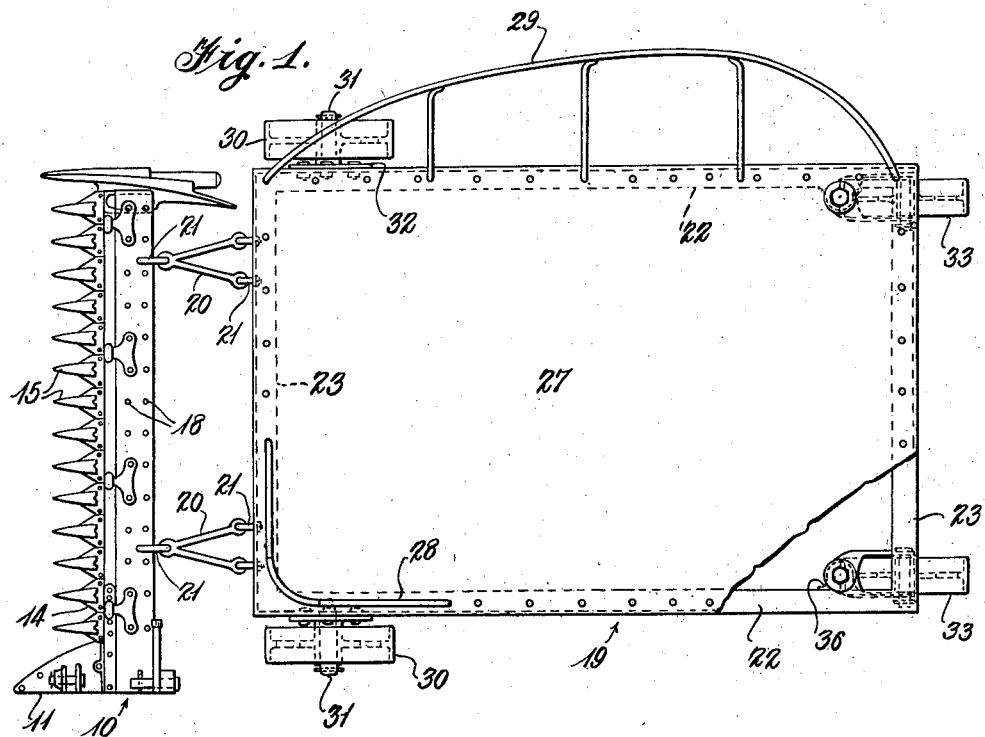
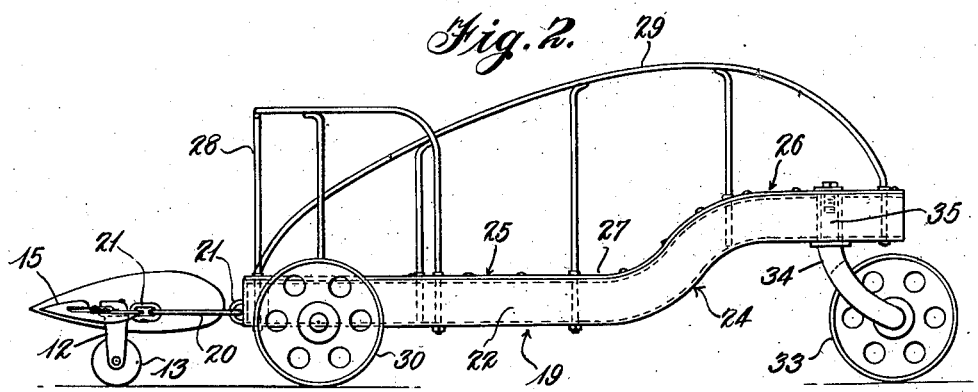
Inventor
Arthur Emery
By *L. Umald Myus*
Attorney Patented Nov. 17, 1936

2,061,353

UNITED STATES PATENT OFFICE 2,061,353

CORNSTALK HARVESTER

Arthur Emery, Lawrence, Kans.

Application March 10, 1936, Serial No. 68,111

9 Claims. (Cl. 56—197)

This invention relates to corn stalk harvesting devices.

The primary object of this invention is to provide a harvesting machine especially designed for cutting corn stalks and accumulating the stalks on a trailer to permit them to be readily tied in bundles and discharged from the trailer.

A further important object of the invention is to provide a corn stalk harvester which will include a trailer structure especially adapted for being connected to a properly designed reciprocating cutter of the mowing machine type with the trailer being supported on wheels and connected to the cutter bar in a manner to permit the trailer to be backed readily while turning the harvester around.

Another object of the invention is to provide a harvester trailer which will support cut corn stalks in a manner to permit a person riding on the trailer to rapidly and easily tie the stalks into bundles and roll the bundles off of the trailer.

Other objects and advantages of the invention will be apparent as the description proceeds.

In the accompanying drawing forming a part of this specification and in which like numerals are employed to designate like parts throughout the same, Figure 1 is a top plan view of the corn stalk harvester embodying this invention, Figure 2 is a side elevational view of the harvester shown in Fig. 1, Figure 3 is a detail plan view of one of the specially designed cutter blade guards incorporated in the cutter bar structure disclosed in Figs. 1 and 2, and Figure 4 is a detail vertical sectional view illustrating a feature of construction of the trailer.

In the drawing, wherein for the purpose of illustration is shown the preferred embodiment of this invention, the numeral 10 designates in its entirety a cutter bar which is of the same general design and mechanical construction as the cutter bar structure employed in mowing machines. This cutter bar includes an end structure 11 designed for being connected to the usual wheeled sulky of a mower. The opposite end of the cutter bar 10 is disclosed in Fig. 2 as having a depending fork or leg 12 to which is journaled a roller 13.

It has been determined that a cutter bar approximately three feet in length is of proper size for the purposes of this corn stalk harvester. It is intended that only one row of stalk be cut at a time. To better enable the reciprocating cutter blade 14 to be protected against damage during cutting of the stalks, a more rigid type of guard tooth is employed. Figure 3 discloses in detail one of the guard teeth 15 as having a relatively long ear or mounting shank 16 which is provided with two apertures 17 instead of the usual one. Figure 1 discloses pairs of apertures 18 formed in the main frame member of the cutter bar for receiving rivets, bolts, or the like which are passed through the aperture 17 of the guard tooth 15 to secure these teeth in place.

Figures 1 and 2 disclose the construction of a trailer structure which is designated in its entirety by the reference character 19. This trailer 19 is coupled to the cutter bar 10 by means of a pair of transversely spaced, V-shaped links 20 which are connected at the three terminals to the cutter bar 10 and the trailer frame by means of eyes 21. This V type of link enables the trailer to be backed properly when coupled to the cutter bar.

The trailer includes a frame made up of side bars 22 and end bars 23. Each one of these bars is of channel formation, as shown in section in Fig. 4. The opposite side bars 22 are reversely curved at 24 to provide a main platform portion 25 and a stepped up rear portion or shelf 26. A top plate 27 is bolted or riveted at its edges to the top flanges of the various bars 22 and 23 and is reversely curved to correspond in shape to the tops of the side bars 22. This reversely curved or stepped formation of the trailer functions to hold the middle portions of the corn stalks cut by the bar 10 elevated from the top or plate 27 of the trailer to enable a person riding on the trailer to pass a binding cord around a number of accumulated stalks to tie the said stalks into a bundle.

Figures 1 and 2 disclose a railing 28 at one front corner of the platform. This railing acts as a guard for the person riding on the trailer to prevent the cut corn stalks from being whipped or thrown against the said occupant. Along the opposite longitudinal edge of the trailer 19 is a railing 29 which is curved upwardly and outwardly. This railing functions to retain the cut corn stalks from falling laterally off of the far side of the platform. Due to its being curved upwardly and laterally, a bundle of corn stalks can be readily rolled upwardly over the same to be discharged laterally of the trailer.

The front portion of the trailer is supported by the side rollers or wheels 30 which are journaled on stub axles 31 carried by brackets 32 riveted to the side bars 22. The rear portion of the trailer 19 is supported by wheels or rollers 33 of the caster type. That is, each roller or wheel 33 is connected to the trailer by means of a fork 34 which has a spindle 35 journaled in a bracket 36 which is bolted or otherwise suitably secured to a side bar 22.

It readily will be appreciated that with the cutter bar properly connected to a wheeled, horse-drawn sulky of the type incorporated in ordinary mowers, the cutter bar and the trailer may be moved along a row of corn stalks. The mechanism of the horizontal cutter bar 10 will function to cut the stalks at the proper distance from the ground. These cut stalks will fall rearwardly onto the trailer 19. The stepped up rear portion or shelf 26 of the trailer will hold the intermediate portions of the cut stalks elevated from the platform or top of the trailer a sufficient distance to enable a person riding on the trailer to insert an arm beneath the stalks in a manner to permit a tying cord to be passed around the stalks and tied to form a bundle. As each bundle is properly tied, it may be easily rolled off of the trailer due to the upward and lateral curved formation of the guard rail 29.

It is to be understood that the form of this invention herewith shown and described is to be taken as a preferred example of the same, and that various changes in the shape, size and arrangement of parts may be resorted to without departing from the spirit of the invention or the scope of the subjoined claims.

Having thus described the invention, I claim:

1. A corn stalk harvester comprising a horizontal cutter bar, a wheeled trailer, and a pair of spaced, V-shaped links connecting the trailer to the cutter bar so that the corn stalks cut by the bar will fall onto the trailer.

2. A corn stalk harvester comprising a horizontal cutter bar, a wheeled trailer having a stepped up rear platform portion with the wheels located at the rear of the platform being of the caster type and positioned beneath said stepped up portion so that they may turn throughout a complete circle during backing of the harvester, and a draft connection between the trailer and the cutter bar.

3. A corn stalk harvester comprising a horizontal cutter bar, a wheeled trailer having a stepped up rear platform portion with the wheels located at the rear of the platform being of the caster type and positioned beneath said stepped up portion so that they may turn throughout a complete circle during backing of the harvester, and a pair of spaced V-shaped links connecting the trailer to the cutter bar so that the trailer will be positioned to receive corn stalks cut by said bar.

4. A corn stalk harvester comprising a horizontal cutter bar, a wheeled trailer having a railing at one side to retain the cut stalks on the trailer platform, and links for connecting the trailer to the cutter bar.

5. A corn stalk harvester comprising a horizontal cutter bar, a wheeled trailer having a railing at one side to retain the cut stalks on the trailer platform, and a guard railing at one front corner of the trailer to protect the occupant of the latter, and links for connecting the trailer to the cutter bar.

6. A corn stalk harvester comprising a horizontal cutter bar, a wheeled trailer having a railing at one side to retain the cut stalks on the trailer platform, and a pair of spaced V-shaped links connecting the trailer to the cutter bar.

7. A corn stalk harvester comprising a horizontal cutter bar, a wheeled trailer having a railing at one side to retain the cut stalks on the trailer platform, and a guard railing at one front corner of the trailer to protect the occupant of the latter, and a pair of spaced V-shaped links connecting the trailer to the cutter bar.

8. A corn stalk harvester comprising a horizontal cutter bar, a wheeled trailer having a stepped up rear platform portion with the wheels located at the rear of the platform being of the caster type and positioned beneath said stepped up portion, said trailer having a railing at one side to retain the cut stalks on the trailer platform and a guard railing at one front corner of the platform to protect an occupant of the latter, and links for connecting the trailer to the cutter bar.

9. A corn stalk harvester comprising a horizontal cutter bar having guards for the cutter blade of the bar with relatively large mounting ears, each one of which is secured to the frame of the machine by two fastening elements, a wheeled trailer, and a pair of spaced V-shaped links connecting the trailer to the cutter bar.

ARTHUR EMERY.